(12) United States Patent
Gatt

(10) Patent No.: US 8,268,027 B2
(45) Date of Patent: Sep. 18, 2012

(54) MELTABLE FUEL GAS GENERATION APPARATUS AND METHODS

(76) Inventor: Raymond M Gatt, Hummelstown, PA (US)

( * ) Notice: Subject to any disclaimer, the term of this patent is extended or adjusted under 35 U.S.C. 154(b) by 174 days.

(21) Appl. No.: 12/709,967

(22) Filed: Feb. 22, 2010

(65) Prior Publication Data

US 2011/0289848 A1 Dec. 1, 2011

Related U.S. Application Data

(60) Provisional application No. 61/235,225, filed on Aug. 19, 2009, provisional application No. 61/254,142, filed on Oct. 22, 2009.

(51) Int. Cl.
*C10J 3/46* (2006.01)

(52) U.S. Cl. ........ 48/197 R; 48/61; 48/127.5; 48/127.9; 48/199 R; 48/203; 48/212; 48/62

(58) Field of Classification Search ............... 431/289, 431/288, 206, 325
See application file for complete search history.

(56) References Cited

U.S. PATENT DOCUMENTS

| | | | |
|---|---|---|---|
| 1,574,625 A * | 2/1926 | Grimmeisen | 431/309 |
| 1,861,956 A * | 6/1932 | Dearborn et al. | 208/7 |
| 2,771,763 A | 11/1956 | Kracauer | |
| 3,262,290 A | 7/1966 | Huber | |
| 3,873,263 A | 3/1975 | Decroix | |
| 3,975,138 A * | 8/1976 | Kinney et al. | 431/161 |
| 4,084,086 A | 4/1978 | Bandel | |
| 4,134,718 A | 1/1979 | Kayfetz et al. | |
| 4,318,689 A | 3/1982 | Forster et al. | |
| 4,421,477 A | 12/1983 | Adachi et al. | |
| 4,856,464 A * | 8/1989 | Hosoi | 123/184.39 |
| 5,222,186 A | 6/1993 | Schimanski et al. | |
| 5,484,086 A | 1/1996 | Pu | |
| 5,527,449 A * | 6/1996 | Brown et al. | 208/179 |
| 5,692,095 A | 11/1997 | Young | |
| 5,870,525 A | 2/1999 | Young | |
| 5,980,241 A | 11/1999 | Schirneker | |
| 6,162,046 A | 12/2000 | Young et al. | |
| 6,193,940 B1 * | 2/2001 | Kang et al. | 422/198 |
| 6,347,936 B1 | 2/2002 | Young et al. | |
| 6,585,509 B2 | 7/2003 | Young et al. | |
| 2002/0086253 A1 | 7/2002 | Young et al. | |
| 2005/0217522 A1 * | 10/2005 | Dylla et al. | 101/216 |
| 2007/0191713 A1 * | 8/2007 | Eichmann et al. | 600/471 |
| 2008/0044783 A1 * | 2/2008 | Matsuyama et al. | 431/289 |

FOREIGN PATENT DOCUMENTS

| | | |
|---|---|---|
| EP | 0540133 A2 | 5/1993 |
| GB | 2080514 A | 2/1982 |
| JP | 2001-235114 A | 8/2001 |

OTHER PUBLICATIONS

R. Fowler, The Design of a Wax-Burning Stove, Dissertation—University of Johannesburg, Jan. 2005. 121, South Africa.

* cited by examiner

*Primary Examiner* — Kaity V. Handal
(74) *Attorney, Agent, or Firm* — Rhoads & Sinon LLP; Kurt L. Ehresman

(57) ABSTRACT

Gas generation apparatus and methods are provided, including apparatus and methods for efficient vaporization, and optional burning, of meltable fuels. The apparatus and methods provide controlled generation and combustion of any low melting point dimensionally stable combustible meltable fuel. This is preferably accomplished by first converting the solid or semi solid meltable fuel material into a liquid state, then into vapor, and finally mixing with an air source or other oxidizer before combustion.

19 Claims, 11 Drawing Sheets

US 8,268,027 B2

MELTABLE FUEL GAS GENERATION APPARATUS AND METHODS

CROSS-REFERENCE TO RELATED APPLICATIONS

This application claims priority to earlier filed U.S. Provisional Patent Application No. 61/235,225 filed Aug. 19, 2009 and U.S. Provisional Patent Application No. 61/254,142, filed Oct. 22, 2009.

FIELD

Gas generation apparatus and methods are provided, including apparatus and methods for efficient vaporization, and optional burning, of meltable fuels.

BACKGROUND

Known fuel burning apparatus utilize various fuels such as alcohols, kerosene, and other petroleum products in either liquid state and/or vapor ("vapor" also referred to herein as "gas") states. For example, portable camp stoves and heaters commonly utilize kerosene, which in its ambient temperature, unpressurized form is a liquid state fuel. Kerosene and other known liquid state fuels are volatile, flammable, explosive, and sometimes corrosive, making their transport, handling, and use inherently dangerous to a user and the surrounding environment.

In another example, stoves, furnaces, and other combustion apparatus are known to utilize gas state fuels such as propane, butane, isobutane, and the like. For example, propane is provided as a pressurized liquid that converts to gas upon release of pressure from the tank, such as by opening a valve in a supply line to a connected stove or heater. Liquid fuels and pressurized gas fuels are subject to safety, health, and other regulatory restrictions as a result of their flammable, volatile, explosive, corrosive, and other undesirable properties. The inherent properties of known liquid state and gas state fuels present serious challenges in storage, transportation, and use. Commercial transportation of such fuels is highly regulated and restricted, requiring special permits and compliance with health and safety laws, regulations, and procedures, such as HAZMAT, environmental, and Homeland Security, for example. Recreational storage, transportation, and use of known liquid and gas fuels can be just as dangerous, and just as challenging, especially for consumers such as hikers and campers who need to travel through commercial governmentally regulated means such as airlines, trains, ships, and even tunnels. For example, hikers who are traveling to remote locations by air, with few exceptions, cannot carry pressurized propane tanks or liquid fuel for their camp stoves. They must rely upon the availability of such fuels at their ground destination—which may not be available depending upon the location and nature of the destination. Additionally, transport and use of pressurized gas and/or liquid fuel by campers, military personnel, or other users presents a real risk of harm by spillage and/or leakage that can result in severe personal injury whether by flame, explosion, ordinance, or combination thereof. For example, liquid fuel famine relief stoves known as "panda stoves" have been banned from importation into Africa because of the proliferation of fires resulting from kerosene liquid fuel spillage, as well injuries resulting from the design of such stoves. The irony of injuring a starving person or burning down their home by providing a dangerous stove is not lost on the author. Neither is the irony of a soldier surviving combat conditions only to find that his liquid fuel leaked and that he has none left for heat to survive the night. We have a solution, as described herein.

SUMMARY

Apparatus and methods for providing safe, efficient burning of meltable fuel are provided herein. In one embodiment, an apparatus is provided for generating a gas vapor state of at least one meltable fuel, the device comprising a gas generator assembly, wherein the gas generator assembly is configured and disposed to receive a meltable fuel and to convert the received meltable fuel to a gas vapor state. In another embodiment, the gas generator assembly includes a heat transfer element in communicable connection with a heat source and a meltable fuel source.

In another embodiment, the apparatus is a gas generation apparatus comprising a reservoir configured for receiving a meltable fuel; a heat transfer element having an inlet end and an outlet end, wherein said inlet end is in communicable connection with the reservoir, the heat transfer element comprising a thermally conductive material, in thermal connection with a heat source, the heat source configured and disposed to transfer heat to the heat transfer element in a sufficient amount to convert at least a portion of a meltable fuel received by the reservoir to at least a liquid state. Optionally, the apparatus includes a capillary element such as a wick for drawing meltable fuel to the heat transfer element. Optionally, the apparatus may include a heat sink in thermal communication with the heat transfer element for heating meltable fuel contained in a fuel reservoir. Optionally, the heat transfer element may include an outlet for gas vapor to escape.

DETAILED DESCRIPTION

Figure 1:
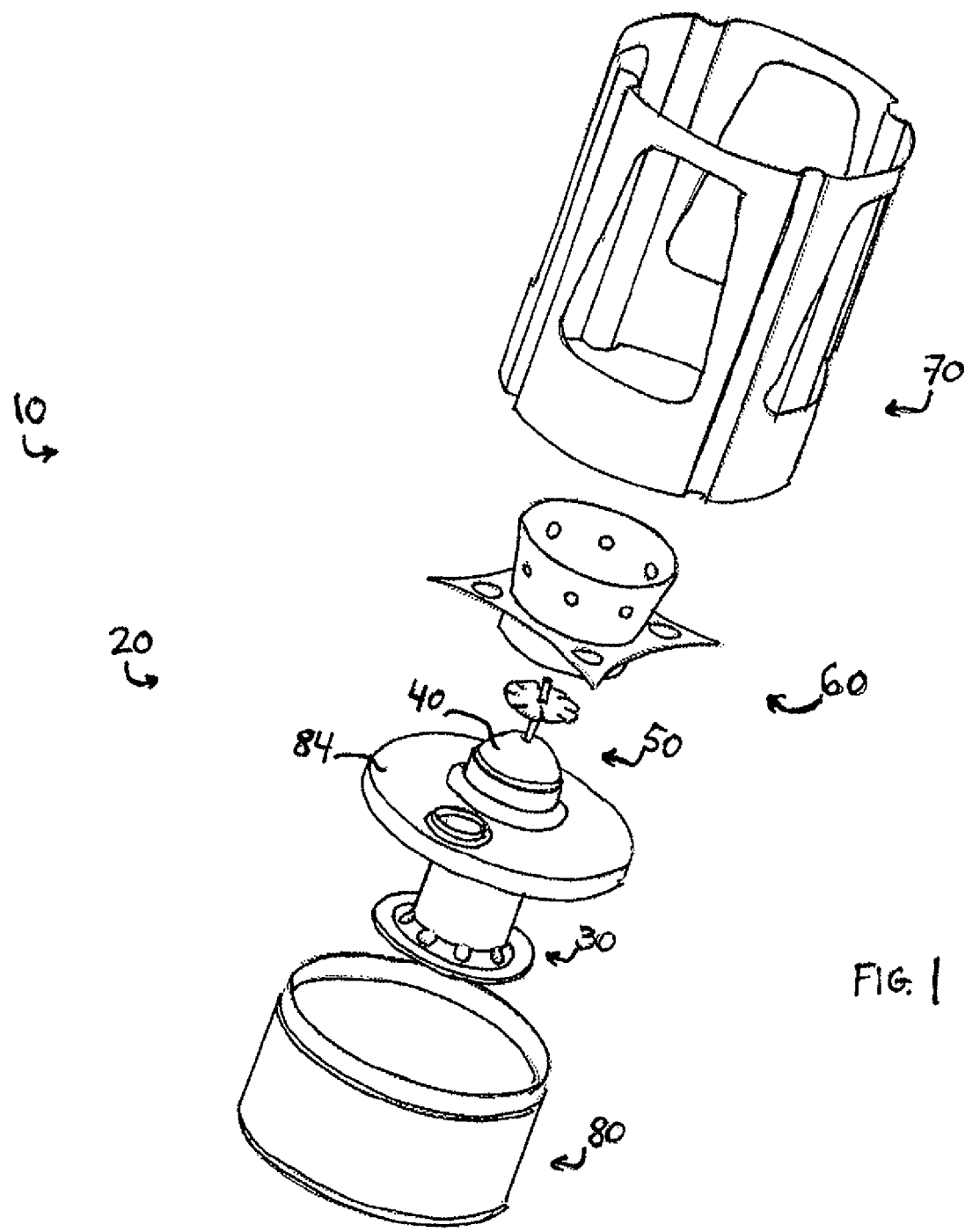
FIG. 1 is an exploded perspective view of an exemplary gas generation apparatus in accordance with the present invention.
Figure 2:
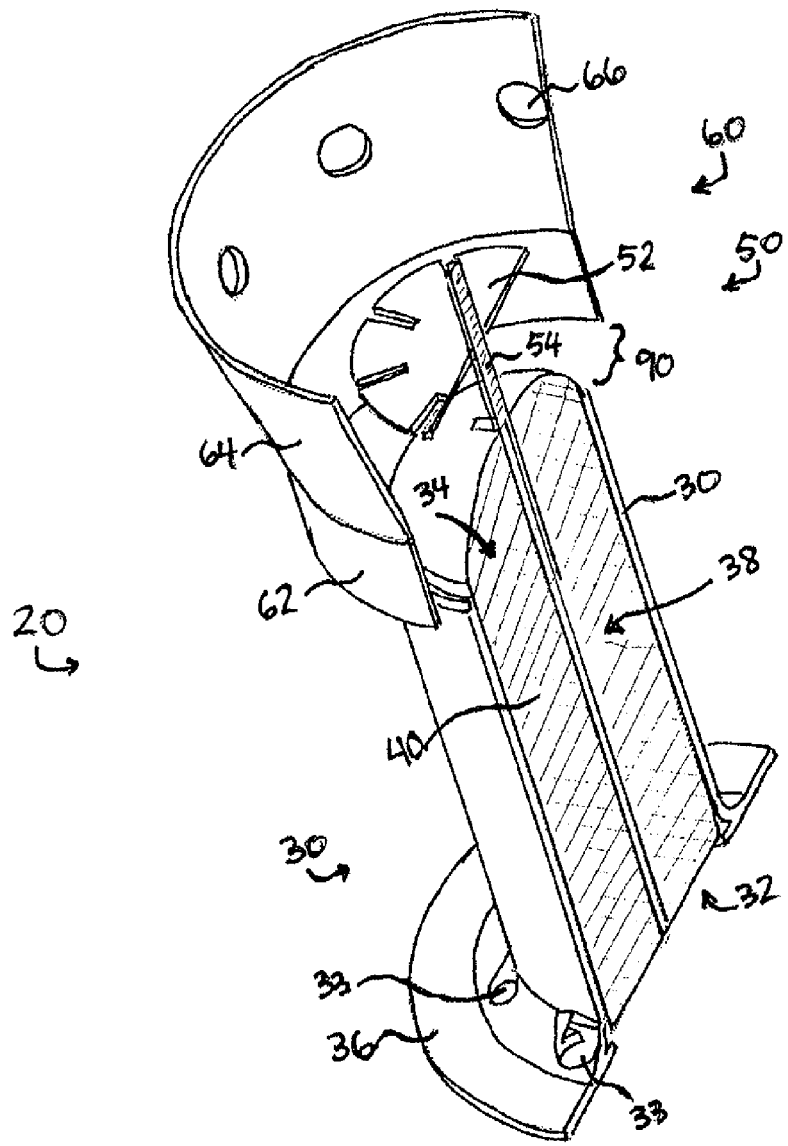
FIG. 2 is a cross-sectional perspective view of the exemplary gas generator assembly of FIG. 1 in accordance with the present invention.

Apparatus and methods for providing safe, efficient burning of meltable fuel are provided herein. Without limitation, "meltable fuel" as used herein includes any fuel that is substantially solid or semi-solid at an ambient and/or room temperature and an ambient and/or atmospheric pressure, but that converts to a liquid and/or vapor state at an elevated temperature and/or reduced pressure. By way of non-limiting example, meltable fuel include waxes such as paraffin waxes, alcohol gels and other gels, flora waxes, fauna waxes, insect waxes, animal waxes, petroleum products, alcohol and other distillates, fats such as fauna fats, flora fats, and any other solid or semi-solid material that is functional as a fuel, and preferably as a combustible fuel when mixed with air or other oxidizers. The apparatus herein are additionally and alternatively adaptable to burning known liquid fuels such as kerosene, diesel, alcohols, and gasolines (hereinafter collectively referred to as "traditional liquid fuels"), by way of non-limiting example.

By way of non-limiting example, apparatus embodiments incorporating the inventor's gas generation technology are illustrated in FIGS. 1-9. As used herein, "stove" is intended as non-limiting, and includes any apparatus having the claimed elements of a gas generation apparatus, and optionally further including a source of ignition for combustion of generated vapor, regardless of its use. For example, the inventor contemplates that the gas generation apparatus and the gas or vapor state fuel it generates can be used as a stove to heat a surrounding or remote space, such as by directing a mixture of vapor and air to an ignition source for combustion and radiating or convecting the resulting combustion heat to a desired area, to heat or sterilize food and beverages for consumption, to provide light, to disperse scents or fumigants, to power engines such as internal combustion and/or external combustion and/or Stirling engines, among other uses described herein and that will be apparent from study of the instant disclosure. Additionally, it may be desirable to provide the gas generation apparatus in the absence of an ignition and/or combustion source, such as to provide a non-ignited gas vapor stream to disperse scents or fumigants, for example.

The principal underlying the apparatus and methods herein involves a gas generation cycle wherein a meltable fuel and/or liquid fuel is converted to a gas or vapor state by the gas generation assembly of the apparatus. In any embodiment, the conversion is accomplished by the application of energy to the fuel to convert the fuel from a solid state to a liquid and/or vapor state. The energy may be provided in any number of individual or combined forms, such as heat, light, radiation, microwaves, electricity, energy pulses, laser, solar, and the like.

For example, in one embodiment, a meltable solid fuel provided is melted to a liquid and/or vapor state by heat transition from a heating assembly of the gas generation assembly. The heating assembly includes a heat source that is selected from any number of types, such as burning wick element, or electrical coil, radiator, or other available energy sources. The heating assembly includes a heat transfer element in thermal connection with the heat source, and further in thermal connection with a meltable fuel source. The heat transfer element is configured and disposed to be heat-conductive, and preferably highly heat conductive at selected operating temperatures compatible with the heat source, meltable fuel, and other features of the apparatus and its intended uses. For example, "highly heat conductive" as used in a paraffin wax stove embodiment described herein means the heat transfer element has a thermal conductivity sufficient to transfer heat from a wick flame heat source to a paraffin wax meltable fuel in an amount sufficient to raise the wax to a temperature above its solid-to-liquid state melting point, e.g. to raise the wax to a temperature above 140° F., for example. In other words, heat transmitted from the heat transfer element is received by meltable fuel. For example, the meltable fuel is preferably contained, such as in a fuel reservoir, so that the fuel is efficiently heated by the heat transfer element to a selected temperature, causing the meltable fuel to change physical state(s). For example, in the example of solid state wax fuel, the transferred heat would covert at least a portion of the solid wax to a liquid state. In that example, the liquid state fuel is then further heated in a controlled manner, such as in a heating chamber, so that it is further converted to its gas vapor state. Such heating and physical state transitions can be selectively controlled to occur in a single fuel reservoir, in a heating chamber, or in any combination thereof, whether as separate or combined processes. For example, liquid state fuel in a first fuel reservoir that is heated by a heat transfer element can be permitted to exit the reservoir by seeping or draining through apertures, wicks, or other communicable means to a heating chamber, where at least a portion of the liquid state fuel is converted to a vapor state, whether by heat, reduced pressure, capillary action, and/or increased surface area. In one embodiment, the heating chamber is incorporated into the heat transfer element (such as a heated conduit, for example, as further described herein). In some embodiments, the apparatus includes a capillary member that serves as a means to increase the surface area of the meltable fuel contained within the reservoir and/or heating chamber, thereby promoting rapid transition and conveyance of a meltable fuel from a solid state through a liquid state and eventually to a vapor state.

Prior art teaches away from intentionally heating fuel, whether gas or liquid, that is contained in a reservoir, such as a reservoir in a kerosene lantern or kerosene stove, for example. Such heating causes traditional known liquid and gas state fuels to expand, causing undesired pressure in the reservoir that can result in leaks. Worse, heating of known traditional liquid or gas state fuels creates the risk of unintentionally exceeding the ignition and/or spontaneous temperature of the fuel, creating an explosion hazard. For those reasons, we note that prior art lanterns and stoves are designed to ensure that any open flame is kept remote from, and not in thermal communication with, the fuel reservoir. For example, we note that U.S. Pat. No. 6,347,936 (the "936" patent"), which relates to portable survival stoves using flammable liquid fuels such as kerosene, white gas, and the like, and discloses an integrated sealed reservoir for containing the flammable liquid fuel. The '936 patent is representative of prior art teachings that specifically emphasize that heat from a combustion zone is to be thermally isolated from the fuel reservoir. The '936 patent describes a stove wherein the "system comprises a porous fuel wick 50 having a low thermal conductivity retained in or feed wick shroud 52." See, '936 patent Col. 13, lines 26-28. The '936 patent further describes the wick shroud surrounding the feed wick as "preferably constructed from a rigid, vapor and liquid impermeable material that is non-corrosive in liquid fuels and has a generally low thermal conductivity." See, '936 patent at Col. 13, lines 52-56. From a further reading of the '936 patent, it is clear that heating of the liquid fuel reservoir is intentionally and desirably avoided. Indeed, the embodiments described in the '936 patent expressly teach away from any transfer of heat to the fuel reservoir. For example, in addition to the low thermal conductivity feed wicks and wick shrouds that are in contact with liquid fuel in the reservoir and the wick, the '936 patent instructs that the liquid fuel wick and feed assembly is thermally insulated from a very hot "vaporization zone" by a "substantially vapor impermeable barrier" assembly. In the embodiments of the '936 patent, that vapor impermeable assembly comprises a series of non-thermally conductive and low-thermally conductive elements arranged to allow heat transfer only from a heated plate to the adjacent surfaces of a porous member, and specifically does not transfer heat to the wick or other liquid feed surfaces and assemblies located beneath the porous member—with no heat transfer suggested or motivated to reach the fuel reservoir. For example, the '936 patent provides that "in an embodiment preferred for use in liquid fuel combustional applications, the substantially vapor impermeable barrier is provided as a shroud 24, constructed from a rigid material having a generally low thermal conductivity, and plate 26, constructed from a rigid material having a generally high thermal conductivity. The generally low thermal conductivity of shroud 24 is sufficiently low to prevent a substantial portion of thermal energy from immigrating from the vaporization zone toward liquid feed surface 12 of porous member 14. The thermal conductivity of shroud 24 is preferably less than about 200 watts per meter-Kelvin ("W/m K"), and more preferably less than about 100 W/m K. The generally high thermal conductivity of plate 26 [located between the heat source 20 and the vaporization zone above the porous member 14] is sufficiently high to transfer the heat required for vaporization to the vaporization zone of the porous member. The thermal conductivity of plate 26 is preferably greater than about 200 W/m K and more preferably greater than about 300 W/m K. This arrangement promotes heat transfer to and within porous member 14 in proximity to vapor release surface 18 and vaporization zone 16, yet it advantageously minimizes heat transfer through porous member 14 between vaporization zone 16 and liquid feed surface 12, and into the liquid feed system and any liquid reservoir." See '936 patent at Col 9, lines 37-59 (emphasis added). The '936 patent further teaches that the porous members "preferably comprises a material having a low thermal conductivity and a substantially uniform pore size. The thermal conductivity of porous member 14 is preferably sufficiently low to maintain a thermal gradient from ambient temperature of liquid feed surface 12 to the temperature of vaporization at vaporization zone 16, and to prevent substantial heat transfer out of vaporization zone 16. Materials having a thermal conductivity of less than about 10 W/m K are suitable for porous member 14, materials having a thermal conductivity of less than about 1.0 W/m K are preferred, and materials having a thermal conductivity of less than about 0.10 W./m K are especially preferred. See, '936 patent at Col. 10, lines 36-48 (emphasis added). This arrangement promotes "thin walled Section 80 is provided to reduce thermal conductivity of shroud 64 where it interferes with porous member 67 thereby reducing and minimizing heat transfer between shroud 64 through porous member 62 (emphasis added). Stainless steel is a preferred material for shroud 64, although many other materials having a low thermal conductivity, such as titanium alloys, are suitable." We note that stainless steel is generally recognized as having a thermal conductivity of about 12 to about 45 W/m K, and that pure aluminum is generally recognized as having a thermal conductivity of about 237 W/m K, with aluminum alloys having a thermal conductivity of generally between about 120 to about 180 W/m K.

Importantly, the apparatus described in the '936 patent is not compatible or combinable with the meltable solid fuels described herein, and does not anticipate the inventions described herein. Indeed, the '936 patent lacks a heat transfer element in thermal communication with a heat source and further in thermal communication with the fuel reservoir. The low thermal conductivity of the porous member and shroud assemblies of the 936 patent are incompatible with the present invention. The '936 patent teachings teach away from and prevent any significant heating of fuel placed in the reservoir, thus preventing a meltable solid fuel from being heated and becoming a liquid moveable by capillary or other action. Indeed, any meltable fuel placed in the apparatus of the '936 patent will remain in its existing, ambient or room temperature solid state, and would not liquefy or migrate to be converted to vapor state fuel as in the present invention.

Importantly, the inventor has discovered that the use of meltable fuels in combination with the apparatus and assemblies described herein provides a high volume of dense vapor gas that exceeds any known apparatus using meltable fuels, such as candles. Indeed, even in the wick flame embodiments described herein, the volume of dense gas vapor generated greatly exceeds the combustion capacity of the wick flame, producing a continuous stream of excess gas vapor that can be used for a number of purposes, including but not limited to downstream mixing with air for combustion, uncombusted fumigation, and as a power source for internal combustion and/or external combustion and/or and Stirling engines, for example.

In an example of the gas generation assembly herein, a heat transfer element is in thermal communication with a heat source, and is further in thermal communication with a meltable fuel reservoir containing a meltable fuel. The heat transfer element preferably includes at least one inlet opening for receiving heated fuel from the reservoir, the heated fuel in a liquid and/or vapor state. The heat transfer element in this embodiment may include one or more heating chambers that receives heated fuel from the inlet opening(s). The heat transfer element in this embodiment further includes at least one outlet to permit vapor state fuel to exit the heating chamber. Optionally, the heat transfer element may include one or more air inlets for receiving air to mix with the heated fuel, and/or to control the pressure within the heating chamber and ensure that the heated fuel exits the outlet opening at a desired rate and/or temperature. In another example, the outlet is configured so that the exiting vapor state fuel promptly mixes with air and therefore can be ignited to form a continuous flame. In other embodiments, the outlet is disposed to permit the exiting vapor to be conveyed to another combustion source, fumigation source, storage vessel, or other gas utilization apparatus. In some embodiments, the fuel vapor production can be increased or supplemented, such as by utilizing a capillary element such as a wick to pull heated fuel from the reservoir and allowing it to evaporate to form an unignited second source of vapor fuel. As shown and described in the figures and specification herein, for example, such a second source of fuel vapor can be created when a diffuser and nozzle assembly are provided in a close proximity position to a heating element and a capillary element such as a wick containing meltable fuel. For example, when the heating element includes an ignited (burning) wick producing a wick flame, lowering a diffuser and nozzle assembly controllably and desirably reduces the air supply available to the wick flame, causing some of the liquid meltable fuel in the wick element to be released as uncombustible dense vapor. The dense, oxygen-deprived gas vapor travels away from the wick element, preferably entering into a nozzle assembly. This dense vapor can then be selectively mixed with air in the nozzle assembly to form a combustible mixture that can optionally be ignited to form a combustion flame. Alternatively, the dense vapor can be selectively directed to another destination, such as a storage tank, internal combustion engine, fumigation area, or other apparatus or use. In some stove embodiments shown and described herein involving a wick flame as the heat source, a self-generated or spark-induced combustion flame is formed distinct from the wick flame, appearing as high as several inches above the wick flame depending upon the air-fuel mixture characteristics provided by the diffuser and nozzle assemblies.

As further shown and described herein, where a diffuser and nozzle assembly is optionally provided, adjusting the diffuser and/or nozzle position relative to a wick flame heat source can provide adjustment of the volume of gas vapor generated by the gas generation assembly can control the wick flame, as well as the flame characteristics of any downstream combustion flame. The diffuser element is preferably adjustable so that its proximity to the heat source, such as a wick flame, can be adjusted by a user. Moving the diffuser element closer to a heating element such as a burning wick flame will reduce the amount of air and associated oxygen getting to the flame, thereby reducing the intensity and size of the wick flame. In this manner, the wick flame is caused to emit unburned fuel vapor—not only from vapor exiting the heating chamber, but also supplemental vapor from the heated wick proximate the wick flame due to the lack of sufficient oxygen for combustion as a result of the close diffuser location. Conversely, moving the diffuser element further from the wick flame heating element allow more air and associated oxygen to reach the wick flame causing it to increase in size and allowing it to consume the otherwise unburned fuel vapor emission. The inventor has observed that the location of the diffuser and nozzle can be controlled so that the wick flame will burn in a clean blue sphere, much like a pilot light, generating enough heat to maintain the thermal cycle of melting fuel and vaporizing it in the heating chamber, yet allowing copious volumes of the generated vapor to pass through and around the wick flame without combusting. In contrast, spacing the diffuser and nozzle assembly far from the wick flame (or removing the diffuser entirely) allows the wick flame to consume more vapor fuel (whether generated from the wick or the heating chamber)—and produces a very dirty, sooty, orange flame that lacks the heat intensity of a downstream nozzle-controlled combustion flame in the diffuser/nozzle examples later described herein. When present, the nozzle assembly is configured and disposed to combine dense, oxygen-poor gas state fuel exiting the heating chamber outlet (along with any dense gas vapor from the wick element) with air containing oxygen. In stove embodiments, the nozzle mixes the vapor with air to form a combustible mixture. The nozzle assembly preferably includes features to direct and mix the fuel vapor flow with air, control vapor and air flow rate, and directing flow. The nozzle may include a converging and/or diverging inner nozzle surface configured to contain the gas vapor and to control its flow rate, and/or to direct flow towards a desired location for combustion or storage. Optionally, in the nozzle assembly, additional air is added (whether by apertures, openings, forced air, fans, or otherwise) to the gas vapor thereby providing an oxygen-rich, combustible mix of air and fuel for combustion at a desired location. In other example, the nozzle can direct air against the wick flame and/or other heat source, altering the heat source's temperature and other properties. Optionally, when remote combustion is desired for cooking or other application, a combustion flame is produced downstream of the nozzle assembly.

The apparatus and method provides the additional benefit that when the heat source is turned off, removed, or otherwise deactivated, the meltable fuel in the apparatus (whether in a reservoir, heat transfer element, wick, or elsewhere) returns to its solid or semi-solid state, making it substantially spill proof and leak proof for storage and transport between uses. In one example, when the wick flame is extinguished, the meltable fuel in the wick and in the fuel reservoir returns to its normal, ambient substantially solid or semi-solid state. This is caused by extinguishing the wick flame and halting the transfer of heat from the heat source to the heat transfer element, thereby halting heat transfer to the meltable fuel reservoir, and thereby stopping the generation of meltable fuel liquid and vapor states. The return of the meltable fuel to substantially solid or semi-solid state makes the apparatus spill-proof, and also substantially non-flammable if exposed to a low-intensity flame or other ignition source. When paraffin wax is the fuel, the fuel is non-flammable in its solid state, and is nearly infinitely storable without degradation. Once the thermal cycle is re-initiated by turning on the heat source, the wax will again cycle through its liquid and vapor states without clogging, pressurizing, priming, or other fueling activity by the user. These features and advantages are unprecedented in known portable camping stoves and any other combustion or gas generation devices fueled by known liquid and/or gas fuels.

Moreover, the apparatus described herein have allowed the inventor to reach the full thermal potential of meltable fuels. Using the examples herein, the inventor has produced an intense, large, hot, continuous flame of over 1400 degrees Fahrenheit. That result shows that the inventive embodiments described herein are harnessing the energy potential of paraffin wax, which has a heating value of about 18,500 BTU per pound. Notably, the BTU of liquid kerosene is nearly identical—yet cannot be achieved without the safety hazards of spillage and explosion as described herein. In contrast, paraffin wax has a flash point of over 250° C. (about 480° F.) and solidifies to a non-combustible solid upon cooling. Solidification begins almost immediately upon any drip or spill from a reservoir of liquid state paraffin wax. Ask your local manicurist or spa—people soak their hands in hot paraffin by choice. They don't soak in kerosene.

The gas generation cycle disclosed herein, further including apparatus for the generation of combustible mixtures of vapor and air, is much more powerful than any existing candle-type solid fuel apparatus. Indeed, the combustion flame produced by the apparatus and methods herein appear to be as powerful, or more powerful, than known catering apparatus. Such known sterno apparatus uses a volatile jellied alcohol and produces a clear blue flame that is dangerous if spilled fuel is ignited because it burns hot and is difficult to spot. In contrast, the present apparatus uses meltable solid and semi-solid fuels to avoid those undesirable risks. Furthermore, the non-volatile, non-explosive, and waterproof nature of meltable fuels such as waxes makes the apparatus suitable for military use by amphibious personnel, even if exposed to gunfire and explosions. Indeed, meltable fuels such as wax can safely be carried on a person's body and even with food supplies without concern. In contrast, personnel and vehicles carrying fueled stoves using any other known liquid and gas fuel risk a significant increased risk of exposure to flammable leaks and spills, which may cause property damage, injury and even death. The above and other advantages will be further evident by the following examples and illustrations.

EXAMPLES

A first, non-limiting example of an apparatus is illustrated in FIGS. 1-8 hereof. The apparatus embodiment shown in FIGS. 1-8 accomplish the above-described thermal fuel (and optional combustion) cycle by the use of the elements as shown and described. In the FIGS. 1-8, elements are described and shown individually, and as an assembly, in both perspective and cross-sectional views. The figures also show some exemplary shapes and other features of the elements and assemblies, although any number of geometric shapes and sizes of elements are contemplated by the inventor to form additional embodiments.

Note that, although FIGS. 1-11 illustrate the examples of the apparatus as being generally circular having in a diameter of approximately 1 inch to about 10 inches, and a height of about 2 to about 12 inches, the apparatus can be provided in any shape or size, and can be tuned and adjusted to provide a desired structural rigidity, flame size, selected number of heating elements, reservoirs, gas generator assemblies, nozzles, and other elements to provide the desired generation of fuel vapor from a meltable fuel (or even a traditional liquid fuel) to meet the intended purposes of a user. Indeed, the inventor has conceived and reduced to practice several miniaturized embodiments, without sacrificing the heat and other performance characteristic advantages of the invention. Exemplary apparatus have been assembled and tested, and have provided excellent results. The assemblies have been shown to efficiently generate vapor state fuel from meltable fuels including paraffin, beeswax, and soy wax in accordance with the previously described gas generation cycle, using apparatus and features described herein. The generated vapor state fuel is rich and dense, and requires mixing with air to be suitable for combustion. Otherwise, the dense vapor fuel can be used for fumigation, lubrication, deposition onto surfaces and substrates, and for any other use appropriate for vapor state meltable fuels in their vapor state or upon return to a liquid or solid state. When mixed with air and ignited in an exemplary stove embodiment, the result is a windproof, continuous wick flame and downstream combustion flame that will boil a full cup of room-temperature water in less than 10 minutes. In stark contrast, a large candle ("candle" as used herein is defined as a device having one or more wicks, each wick embedded with and immediately surrounded by a mass of paraffin or other known meltable solid fuel) was unable to boil the cup of water in more than 30 minutes. Indeed, previous attempts to harness significant thermal energy from candles, including multiple wick candles, have failed.

In an exemplary embodiment shown in FIGS. 1-8, meltable fuel 130, such as paraffin wax, is received and contained in a reservoir 80 of the apparatus 10. The meltable fuel 130 can be provided by a number of ways, including: loading a block of solid state meltable fuel 131, into the reservoir 80 of a disassembled stove apparatus 10, then assembling the apparatus 10; pouring heated liquid meltable fuel 132 into the reservoir 80 (whether before or after assembly of the stove 10); and/or by inserting small wax pieces of solid meltable fuel 131 into an opening 82 in the reservoir 80 or reservoir lid 84. Additionally or alternatively, the lid 84 may include a concave portion so as to permit placing of solid state fuel 131 pieces onto the lid 84 and having the heat of the apparatus melt the solid state fuel 131 so that converts to liquid state fuel 132 and drains from the lid 84 through the opening 82 into the reservoir 80. During operation of the stove 10, such heat may be transferred to the lid 82 from the heat transfer element 30 and/or radiant heat from the heat source 22 (shown in the embodiments of FIGS. 1-8 as a wick flame 26). Still further, a gap (not shown) may be provided between the lid 84 adjacent the heat transfer element 30 to allow melted liquid state fuel 131 to drain from the lid 84 into the reservoir 80, such as by providing an inward slope of the lid 84 towards the heat transfer element 30 and causing the melted wax to drain through a gap provided therebetween. The opening 82 may be sized to enable wax sticks (such as crayons), pellets, or other desirable and manageable forms of meltable fuel 130 to be inserted into the reservoir 80, where they melt by the heat of the heat transfer element 30 and by the heat of the liquid state fuel 132 formed thereby. As shown, in one embodiment, the heat transfer element 30 may include an enlarged base 36, such as a disk shaped structure, to act as a heat sink within the reservoir 80, adjacent inlet end 32 of heat transfer element 30. In another embodiment, the opening 82 is mated to a section of heat conductive (e.g. copper) tubing (not shown) that is disposed in thermal contact with the heat transfer element 30 and/or liquid state fuel 132, so that the opening 82 and associated tubing is heated and will rapidly melt inserted solid state meltable fuel 131, such as wax crayons, to a liquid state, thereby refilling the reservoir 80. In any of these manners, and due to the non-pressurized and non-volatile nature of the meltable fuel 130, the stove 10 can be safely and easily refueled even when fully operating with the heat source 22 providing heat, and even with an open reservoir 80, and with an optional hot continuous downstream combustion flame 122.

When provided, a capillary element, here a wick element 40, is preferably in thermal contact with a heat source 22, such as a wick flame 26. The wick element 40 is also shown in thermal contact with a heat transfer element 30, here shown as a generally cylindrical hollow pipe. In the example shown, the desired thermal contact and thermal transfer is accomplished by lighting the wick member 40 at the outlet end 42 of capillary wick member 40, and further by encasing or surrounding the lower reservoir end 44 of the wick member 40 with a heat transfer element 30. Heat transfer element 30 is preferably made of high heat conductive material, preferably copper. The heat transfer element 30 may be provided as a solid, semi-solid or hollow structure. Preferably it is hollow to permit partial or complete surrounding of the capillary wick member 40, except for a protruding outlet end 42. The heat transfer element 30 may additionally or alternatively include one or more internal heat transfer elements 39. Although shown in the figures as a divider that is plate-like and bifurcates the center chamber 38 of the heat transfer element 30, the internal heat transfer element 39 may additionally or alternatively be any heat-conductive or heat-retaining structure, such as a rod, tube, or other structure in thermal contact with the internal surfaces of the wick member 40, and/or as heat-conductive fibers woven into the wick member 40, for example. For example, in one embodiment shown, a first surrounding heat transfer element 30 surrounds the lower wick portion adjacent outlet end 42, while a thin center heat transfer element 39 shaped as a dividing plate is located in a central hollow chamber 38, bifurcating the wick member 40 within the heat transfer element 30. This embodiment also allows the center heat transfer element 38 to act as a mount for the diffuser rod 54, which in turn vertically adjustably holds the diffuser disk 52 of the diffuser assembly 50 in a desired position relative to the wick flame end 42 and the wick flame heat source 26.

Figure 5:
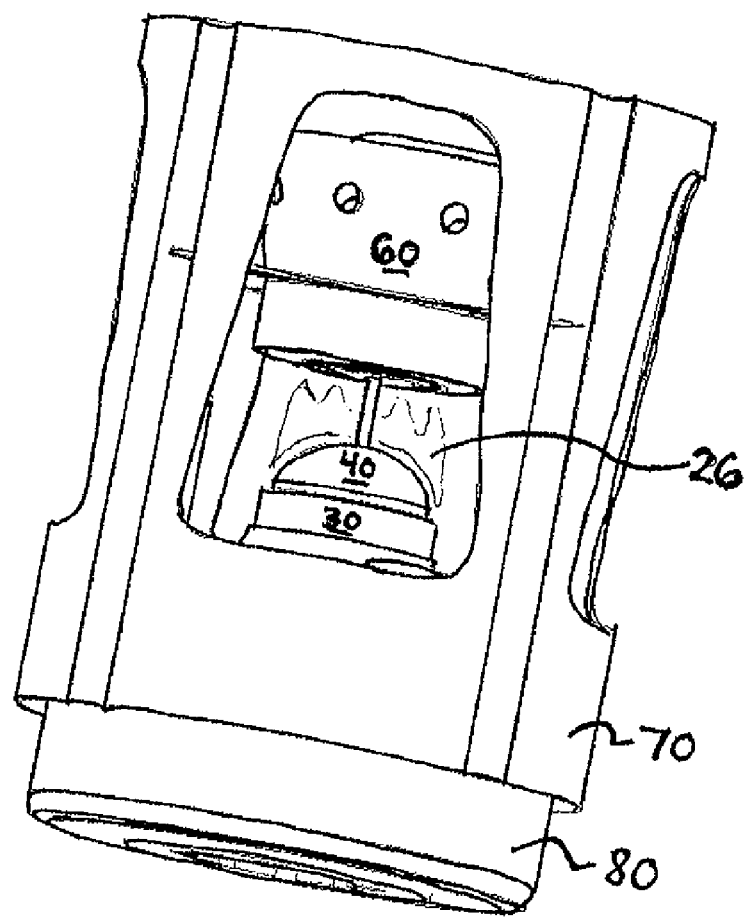
FIG. 5 is a side perspective view of the exemplary apparatus of FIG. 1 in a fully assembled, open position in accordance with the present invention.
Figure 6:
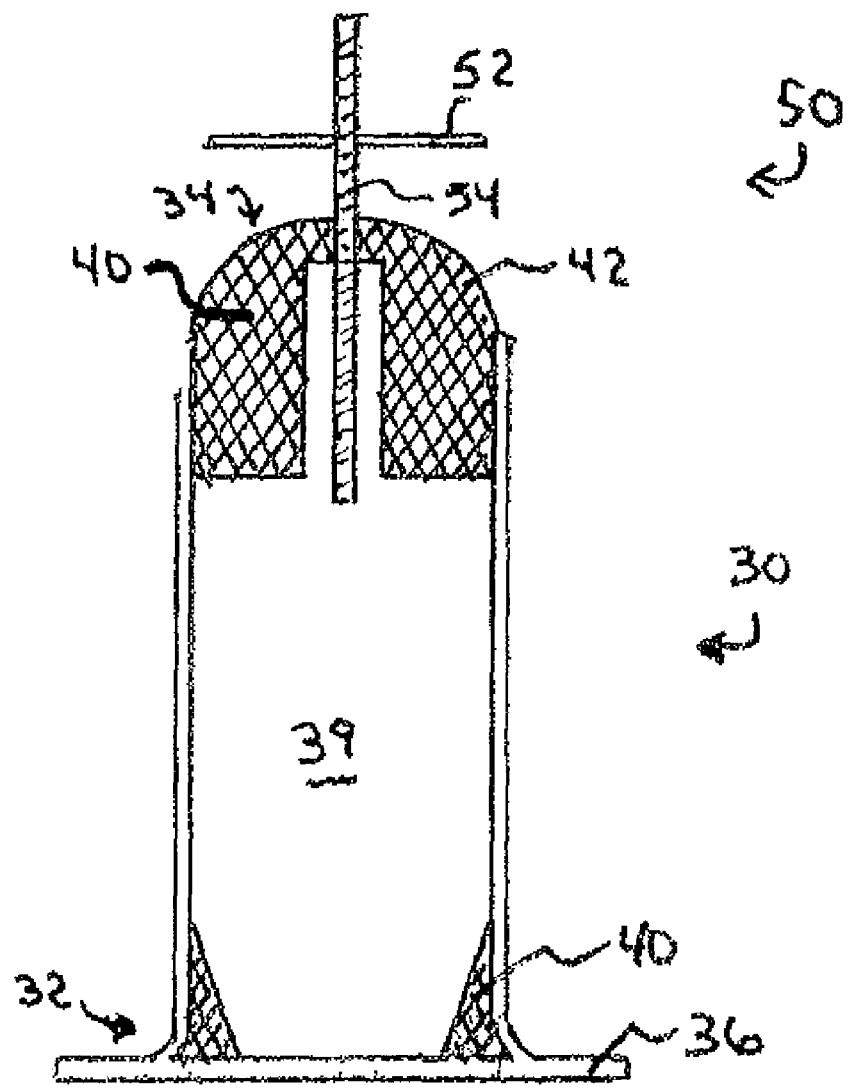
FIG. 6 is a cross-sectional side view of gas generation apparatus in accordance with the present invention.
Figure 7:
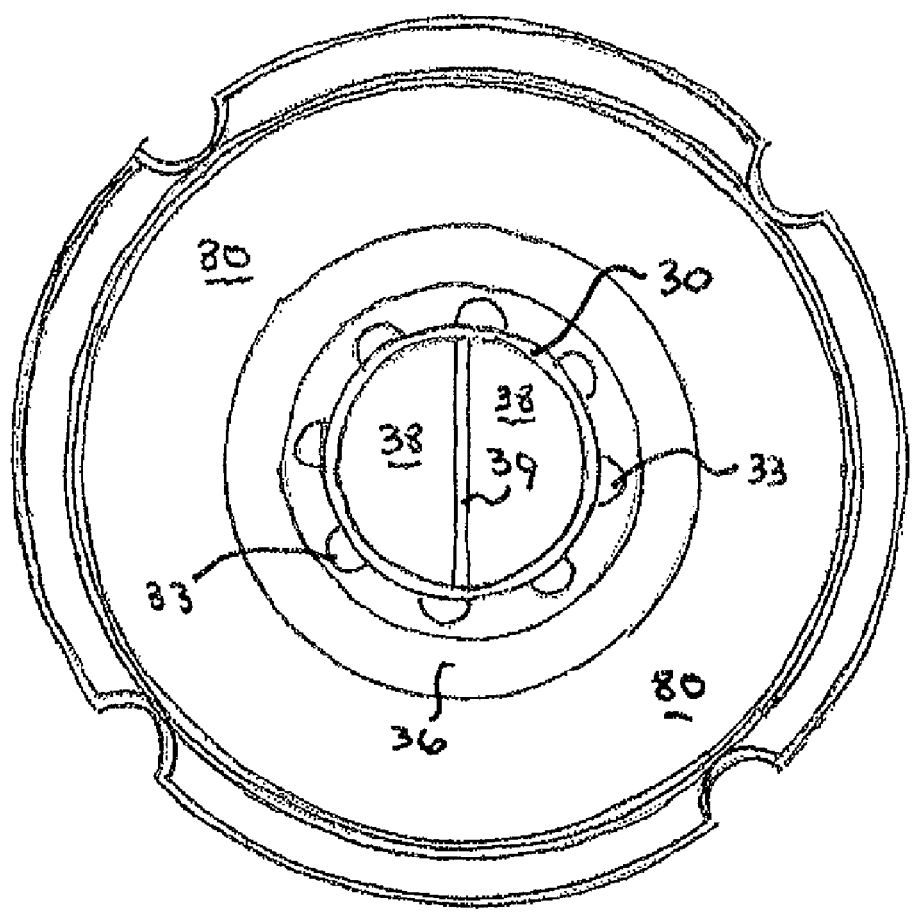
FIG. 7 is a top perspective view of the apparatus of FIG. 6 in accordance with the present invention.
Figure 8:
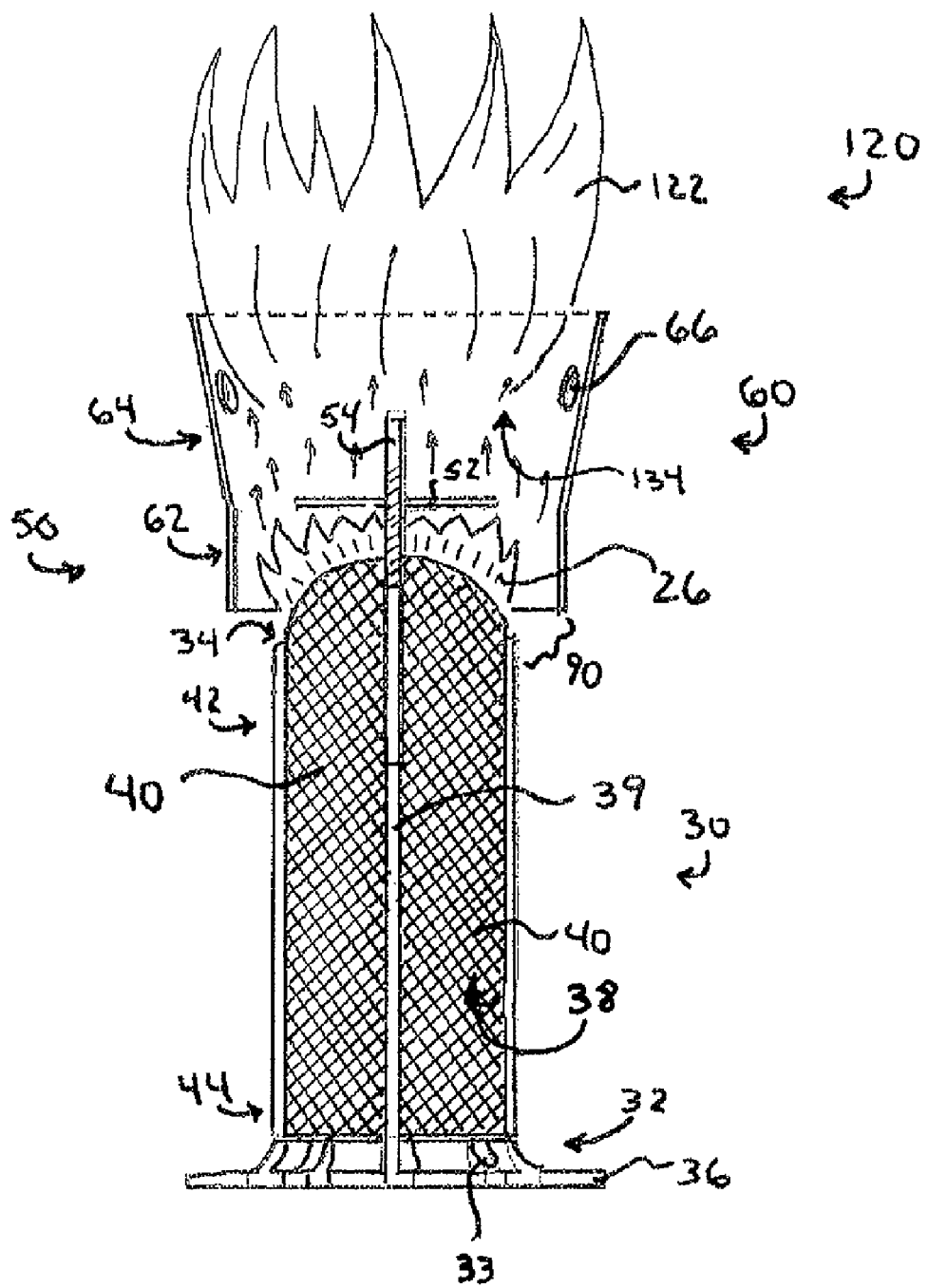
FIG. 8 is a cross-sectional side view of the apparatus of FIG. 6 showing the wick flame and combustion flame in accordance with the present invention.

In order to generate the gas generation cycle, a heat source 22 is needed. In the embodiment of FIGS. 1-8 and 10, the heat source is a wick flame 26, although any source of heat or other energy to convert meltable fuel 130 from its solid state fuel 131 to its liquid state fuel 132 and/or vapor state fuel 134 is contemplated. In these examples, with the stove apparatus 10 in its open position as shown in FIG. 5, it is characterized by the upper housing 70 and fixed nozzle assembly 60 in a position slidably up and away from the reservoir 80 and wick member 40. To light the stove apparatus 10 in this embodiment the user inserts a match through vents 72 provided in the upper housing 70 to reach the outlet end 42 of the wick member 40. Once the outlet end 42 of the wick member 40 (opposite the reservoir end 44) is lit, the lighted end portion of wick member 40 forms a wick flame 26. The wick flame 26 causes meltable fuel 130 impregnated in the wick element 40 to liquefy, and to gas off and burn at the surface of the wick member 40 in almost candle-like fashion. The burning at the outlet end 42 of the wick member 40 causes the heat transfer element 30 (preferably made of copper material or other highly heat conductive material) to absorb heat from the flame 26. Due to the preselected heat conductive properties of the heat transfer element 30, heat from the wick flame 26 is conducted along the entire heat transfer element 30, reaching the reservoir end 44 adjacent the heat transfer member inlet end 32. The inlet end 32 may be open, and/or may include apertures 33 to permit liquid state fuel 132 to enter a heating chamber 38 formed in the heat transfer element 30. Heat from the heat transfer element 30 melts any solid meltable fuel 131 in the reservoir 80 into a liquid state fuel 132 state fuel, which then freely flows into the chamber 38, whether by autogenous pressure of the heating of the reservoir 80, capillary action of a capillary member such as wick member 40, vacuum created from the chamber 38 and wick flame 26, and/or combinations thereof. Once inside the chamber 38, the liquid state meltable fuel 132 is quickly converted to its vapor state, whether by heat, reduced pressure, evaporative action, or combinations thereof. The vapor state fuel 134 then exits the outlet opening 34 of the heat transfer element 30. In the embodiment of FIGS. 1-8, the outlet opening 34 is in immediate proximity to the wick flame 26. However, as previously described herein and as shown in FIG. 5, the closing of the stove, by sliding upper housing 70 fully downward onto reservoir 80, also closes the gap 90 provided between the wick member 40 adjacent the outlet end 42 and the diffuser disk 52, restricting air flow to the wick flame 26. This closed position results in very low, controlled, and sustainable combustion at wick flame 26 to minimize consumption of fuel 130 by the wick flame 26, and allows the dense vapor state fuel 134 to pass out of the outlet opening 34 and past the wick flame 26 without combusting. The diffuser disk 52 further acts to spread the vapor state fuel 134 into a broader stream before it enters the lower portion 62 of the nozzle assembly 60. Once in the nozzle assembly 60, the gas mixes with air drawn through the gap 90 and the apertures 66 provided in the upper diverging portion 64 of the nozzle assembly 60 to produce a combustible mixture of gas and air in a combustion zone 120 that can optionally be ignited to form a downstream combustion flame 122 that appears above the diffuser disk 52.

Again, any number of heat transfer elements 30 may be provided in thermal contact with the heat source (here a wick flame 26), with the common functional feature being that heat from the heat source 22 is conducted to meltable fuel 130 received by the reservoir 80 to convert the fuel 130 to a vapor state fuel 134 in a controlled manner to sustain the gas generation (aka fuel vaporization) cycle described herein. In the examples of FIGS. 1-9 and 10, heat from the heat source 22 (here a wick flame 26) is conveyed by the heat transfer element 30 to meltable fuel in the reservoir 80. Solid state fuel 131 in the reservoir 80 is converted by the transferred heat to a liquid state fuel 132. The resulting liquid state meltable fuel 132 seeps, whether under pressure or by capillary action or otherwise, into inlet end 32 and/or apertures 33 provided in the heat transfer element 30. Once inside the heat transfer element 30 the center conduit of the heat transfer element acts as a heating chamber 38 to hold and heat the liquid state fuel 132 using the surrounding heated walls, capillary wicking material 40 and meltable fuel 130 in the reservoir 80 as chamber boundaries. As a result, the liquid fuel 132 in the heating chamber 38 is heated to a point where it transitions to a vapor state fuel 134, and wherein the vapor pressure of the vapor state fuel 134 exceeds any atmospheric or other external applied pressure, allowing generated vapor state fuel 134 to escape the chamber 38, such as through outlet opening 34. In the case where the chamber 38 is formed as the central conduit of the heat transfer element 30, the vapor rises upward to the outlet opening 34 opposite the reservoir inlet end 32, and preferably adjacent the outlet end 42 and wick flame 26. Importantly, and surprisingly, the inventor has noted that this embodiment generates a very high volume of dense vapor state fuel 134 that blows past the heat source 22 (such as the wick flame 26 and/or electrical element 28) without igniting.

Figure 10:
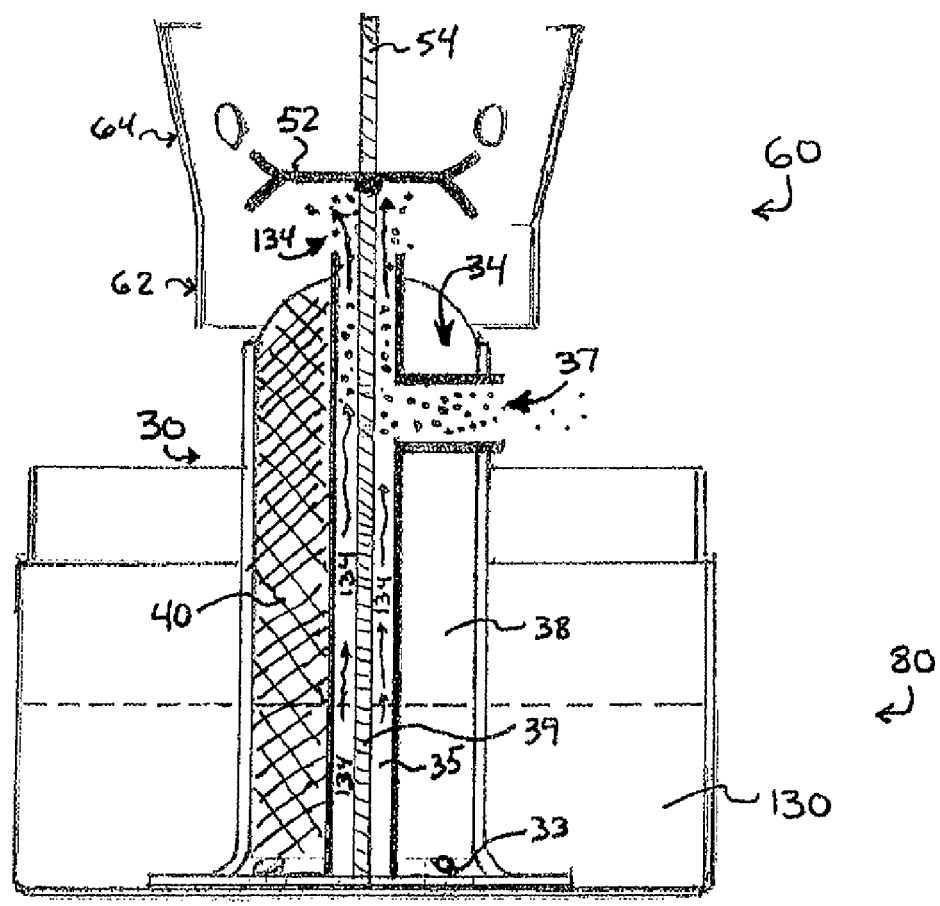
FIG. 10 is a cross-sectional side view of another exemplary apparatus in accordance with the present invention.

Optionally, in another embodiment illustrated in FIG. 10 where the wick flame 26 is desired to fuel a combustion flame 122, one or more air inlets 37 are provided in the heat transfer element 30 and/or reservoir 80 to introduce air at a rate sufficient to produce a combustible mixture of vapor state fuel 132 and air immediately adjacent the outlet end 34, allowing the wick flame 26 or other heat source 22 to ignite the mixture to produce a combustion flame 122. For example, in such an embodiment, as the vapor state fuel 134 travels up the heat transfer element 30, Chamber 38 wick 40 and/or vapor chamber 35, ambient air is introduced through an air intake 37 provided in the sidewall of the heat transfer element 30 which mixes air with the vapor state fuel 134 to produce a combustible air fuel mixture. However, in a preferred stove embodiment, any air mixture prior to the wick flame 26 is controlled so that upon exit from the heat transfer element 30 only a small portion of the combustible mixture is ignited by the wick flame 26 and the rest travels into a provided nozzle assembly 60 where additional air is added before further activity such as ignition to form continuous combustion flame 122. When desirable, the diffuser disk 52 is made from a highly heat conductive material, such as copper, by non-limiting example, so that it can ignite or re-ignite the combustible mixture of air and vapor state fuel 134 once adequately heated by the wick flame 26 or other heat source 22. As shown in FIG. 1 and FIG. 10, the diffuser disk 52 may be substantially solid, may include slots or apertures or tabs, and may be flat, concave, convex, or finned so as to produce the desired separation of the wick flame 26 from the combustion zone 120, and to tune the wick flame 26 as well as the gas and air mixture entering the nozzle 60. In cases where the disk 52 is highly heat conductive, such as comprising copper, the stove 10 is windproof in that the disk 52 will re-ignite the wick flame 26 and the combustion flame 122 by igniting the vapor gas and air mixture that continues to spew from the apparatus 10 so long as the chamber 38 (and optionally vapor chamber 35) is emitting vapor state fuel 134. That period of reignition can be from milliseconds up to several minutes. Along with fortifying the wick flame 26 by contributing additional vapor state fuel 134, the diffuser disk 52 and nozzle apparatus 60 and other apparatus described herein provide a method of routing and directing additional air for efficient combustion and reduced soot output, for example.

Figure 9:
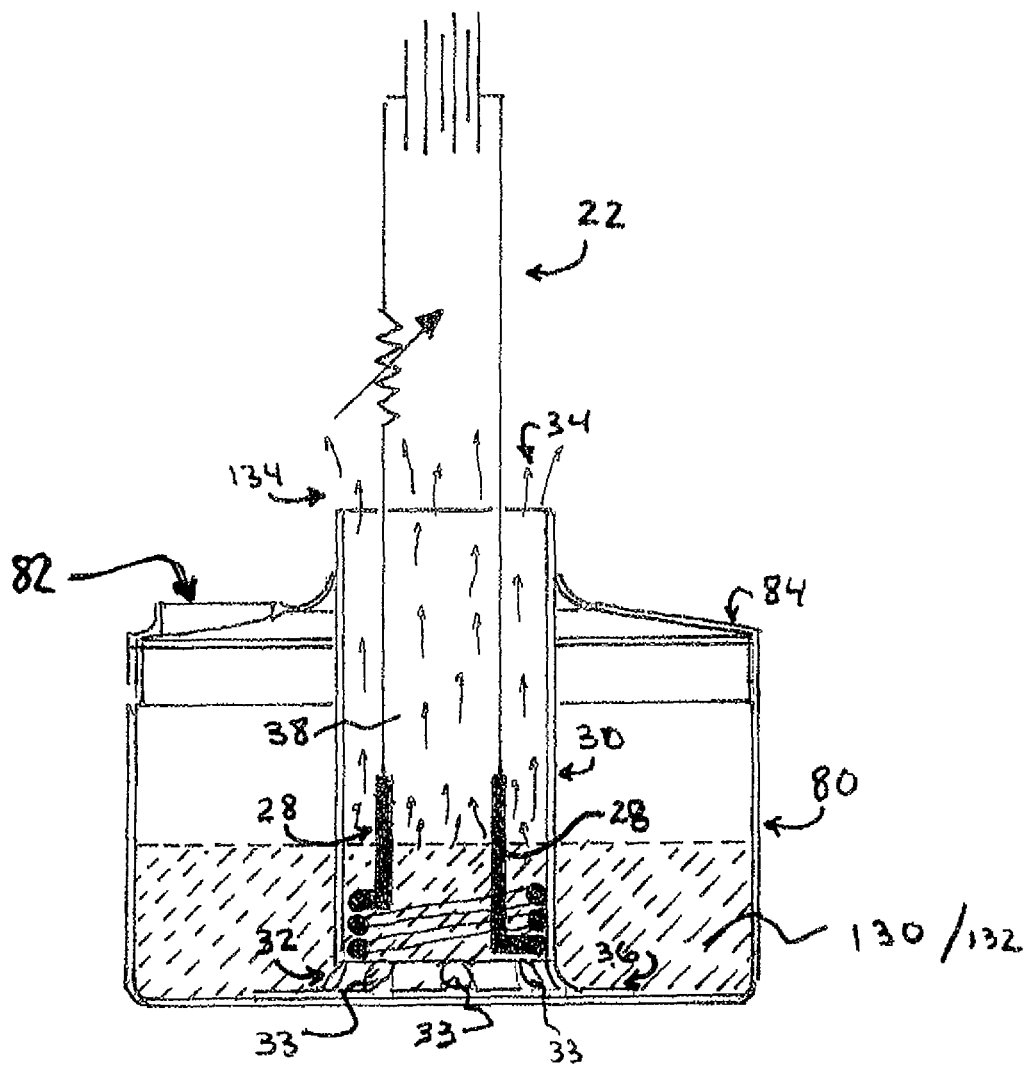
FIG. 9 is a cross-sectional side view of another exemplary apparatus in accordance with the present invention.

As shown in FIG. 9, and as can be accomplished in the apparatus of FIGS. 1-8 by removal of nozzle assembly 60, nozzle assembly 60 is optional where an open, sooty flame is desired, and/or when the gas vapor is not desired to be locally ignited. For example, where the meltable fuel 130 has fumigant properties (such as citronella wax), it may be desirable to simply allow the excess gas vapor state fuel 132 to dissipate from the heat transfer element 30, outlet opening 34, and/or outlet end 42 of wick member 40 in a dense stream, without igniting it, so that a surrounding area fills with vapor, such as to mitigate against insects in a wooded campground, greenhouse, or other space in need of fumigation. Citronella wax mixed in the reservoir 80 or dropped onto the lid 84 or diffuser disc 52 is suitable for this purpose, in this embodiment and also in other embodiments.

However, in stove embodiments and other embodiments where a combustion flame 122 is desired, a nozzle assembly 60 is provided. Preferably, the nozzle assembly 60 is movable, such as by mounting on the slidable upper housing 70 of the apparatus 10. Desirably, the nozzle assembly 60 can be adjustably lowered to be placed in close proximity to the wick 40 and any wick flame 26. In this position, the air supply to the wick flame 26 is reduced, causing the wick flame 26 to consume very little fuel 130, including a minimal amount of any vapor state fuel 134, and thereby allowing the gas vapor state fuel 134 escaping from the heat transfer element outlet 34 to pass by unignited, and further allowing some of the fuel 130 impregnated in the wick member 40 to vaporize without igniting. Any unignited vapor state fuel 134 then travels into the nozzle assembly 60. In the nozzle assembly 60 additional air can be added (whether by an aperture 66, fan, or otherwise) facilitating desirable combustion. In the closed position of FIGS. 2, 3 and 4, the closed position of the nozzle assembly 60 controls a gap 90 that restricts air flow to the wick flame 26, causing the wick flame 26 to achieve a very efficient, pilot-like clean blue appearance that keeps the gas generation cycle of the gas generator assembly continuously churning while burning a minimum of fuel 130.

Optionally, vapor introduction and flame tuning and control can be provided through adjustable means, as shown in the accompanying examples of FIGS. 1-8 and 10-11. For example, as expressly shown in FIG. 2 and FIG. 8, the distance between the wick flame 26 adjacent the outlet end 42 and the diffuser disk 52 can be adjustable, such as by mounting on a threaded rod 54, to allow the diffuser disk 52 to be raised to allow more air flow through the gap 90 to the wick flame 26 and also allowing greater air mixing (such as at higher elevations where air is thinner) in the nozzle assembly 60 prior to combustion by combustion flame 122, or lowered to reduce air to the wick flame 26 (e.g. making fuel burn richer and/or slower due to less air introduction). In examples wherein an internal heat transfer element 39 is provided within the heat transfer element 30, the element 30 can be hollow or solid, and the wicking material of any capillary element, such as wick member 40, selected to permit vapor state gas 134 to percolate up through the wick member 40, and/or through the chamber 38 before reaching the outlet opening 34 and/or wick flame 26.

Some additional elements used in the present example and attached drawings include a reservoir 80 used to enclose and hold fuel, as well as to provide a base to the entire apparatus 10 for placing on a surface, and allowing the upper housing 70 and associated nozzle assembly 60 to be adjusted in relation to the outlet end 42 of the wick member 40. Reservoir 80 provides a rigid structure to the assembly, it is preferably strong enough to support pots, pans, and any special use attachment etc. The reservoir 80 and housing 70 can bear weight, yet are preferably made of lightweight materials which can be rolled, cast, molded, laminated or otherwise fabricated. Examples given in the embodiments shown include, outer side walls that are upright, spiral, perforated, or otherwise disposed. In either case, the walls of the reservoir 80 and upper housing 70 provide support for the apparatus 10, and contain the elements as an assembly. As shown in other figures, the reservoir 80 may be movable relative to the diffuser assembly 50 and nozzle assembly 60. Although not shown, the reservoir 80 and housing 70 and other parts described herein may include hinges, support legs, and/or other attachment means to keep the stove parts movably or fixedly connected in desirable positions. Further, leg members and/or bases members can be provided to stabilize the apparatus 10 from tipping, and/or to support pots and items to be heated in a desired proximity to the combustion flame 122. Any such legs and/or base elements can be retractable and/or removable to permit the device to have an overall reduced diameter, and to fit inside small carrying means such as cups, survival packs, and the like.

Figure 3:
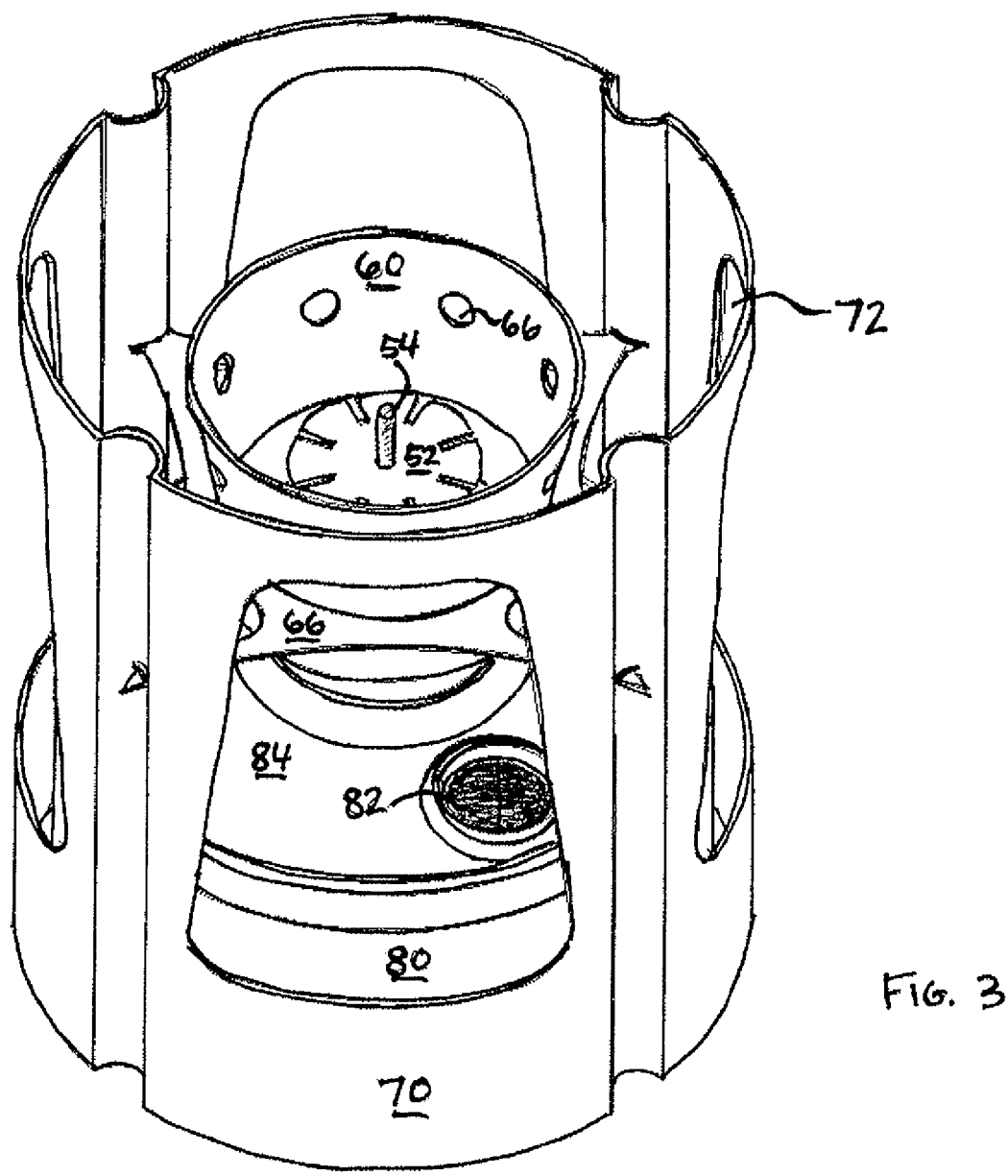
FIG. 3 is a side perspective view of the exemplary apparatus of FIG. 1 in a fully assembled, closed position in accordance with the present invention.
Figure 4:
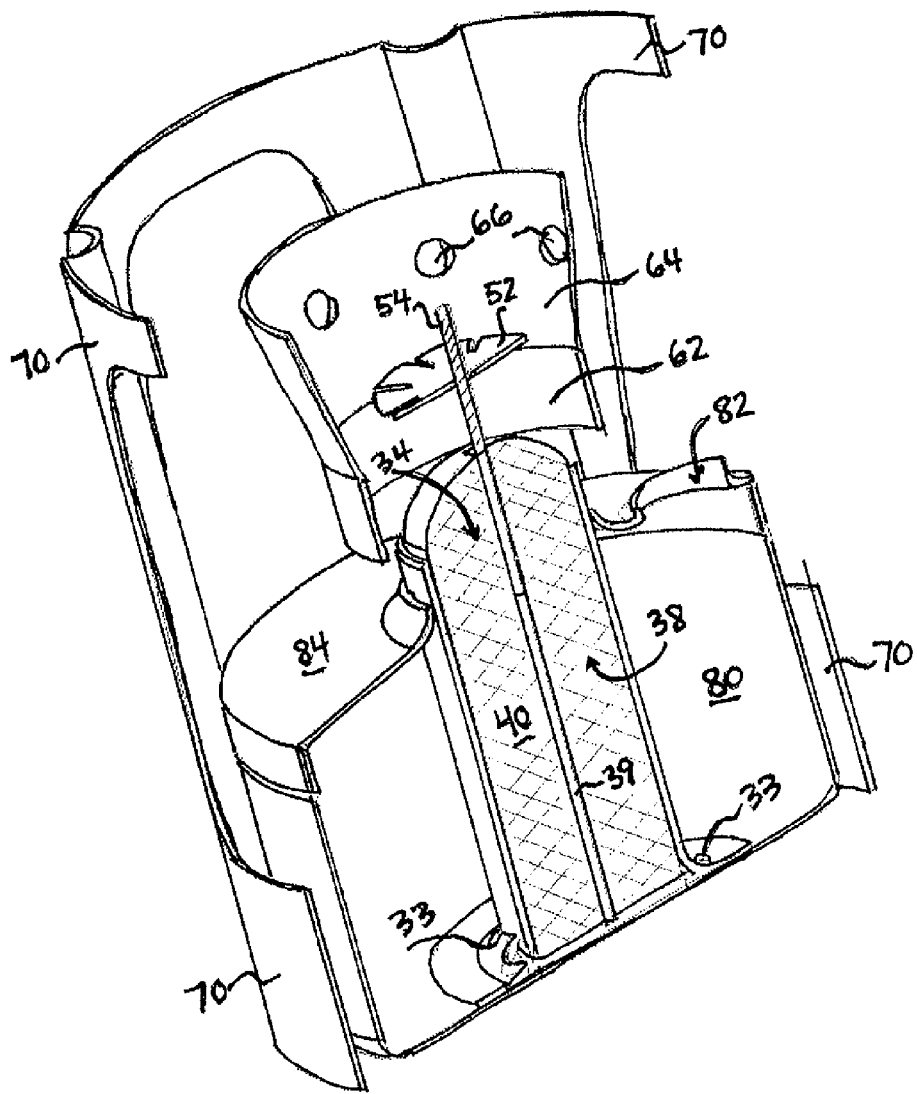
FIG. 4 is a cross-sectional perspective view of the exemplary apparatus of FIG. 3 in accordance with the present invention.

Nozzle assembly 60 and diffuser assembly 50 have a combined effect of containing, shaping, introducing, and mixing vapor state fuel 134 and air, optionally resulting in a controlled low soot combustion flame 122 which can be used for cooking, heating and other functions as desired. The assemblies 60, 50 are preferably adjustable, such as by connection to the upper housing 70 in a manner so their relative positions in relation to one another and to the heat source 22 such as wick flame 26 is adjustable. In the example of FIG. 3, the nozzle assembly 60 includes a mounting base 66 that is fixed by inserting tabs through perforations provided in the housing 70. Additional perforations or vents 72 may be provided in the housing 70 to promote mixing, heat dispersion, gas dispersion, access to the wick 40, nozzle 60, diffuser assembly 50, and other parts of the apparatus 10.

Reservoir lid 84 provides the means to contain the fuel 130 in the reservoir 80, and to protect the fuel 130, whether as solid fuel 131, or liquid fuel 132, from direct and unintended contact with a user, water, or other environmental surroundings. Further, lid 84 optionally facilitates refueling by directing solid meltable fuel 131 to contact against the heat transfer element 30 to promote melting to form a liquid state fuel 132. In some embodiments, the lid 84 is concave, sloped, and/or angled to direct melted liquid state fuel 132 into the lower fuel reservoir 80 through recessed opening 82, or another opening or gap leading to the inside of reservoir 80.

Vapor gas generator assembly 20 with its sub assemblies 30, 40, and 50 (and in conjunction with reservoir 80 and other features shown and described herein is configured to support continuous gas vapor generation by utilizing the resultant heat generated at the wick flame 26 or other heat source 22 to melt the meltable solid fuel 131 and vaporize it. The assembly 20 also has the function of moving melted liquid fuel 132 from the fuel reservoir 80 by capillary action and other forces, such as through the wick member 40 as a capillary material, to a location where it can be collected and/or ignited. In the particular embodiments of FIGS. 1-8 and 10-11, the center chamber 38 of the heat transfer element 30 acts as a chimney tube to trap and further heat a portion of the melted fuel causing it vaporize into a vapor stream and move the resulting vapor state fuel 134 it in an upwardly direction to emanate from the outlet opening 34 where it becomes a vaporized fuel supply for the nozzle assembly 60 positioned above. The nozzle assembly 60 also allows for the addition of air to the vapor stream at various points for the purpose of providing a secondary source of combustible air fuel mixture. Another vapor fuel source for the nozzle assembly 60 is produced at the wicking material surface adjacent wick outlet end 42. The amount of vapor production in relation to wick flame 26 consumption is regulated by moving the nozzle 60 and diffuser assembly 50 down so as to locate it closer to the wick member 40 outlet end 42, effectively blocking, or damping off, some of the combustion air supply to the wick flame 26 causing a very distinct stream of vapor to gas off the wick outlet end 42 without being ignited by wick flame 26.

Figure 11:
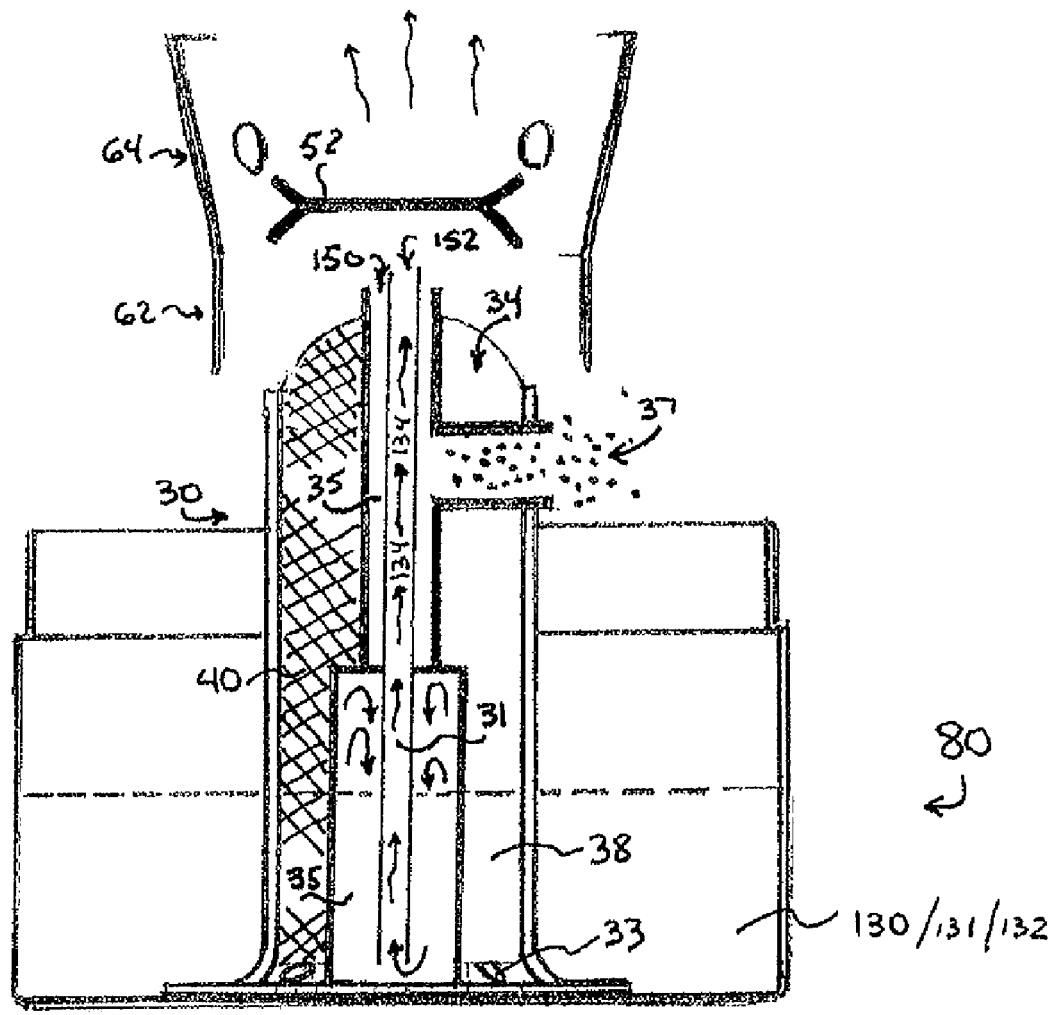
FIG. 11 is a cross-sectional side view of another exemplary apparatus in accordance with the present invention.

Optionally, the apparatus 10 and gas generation assembly 20 can include features to permit pressurization of the fuel 130 in the reservoir 80 and/or chamber 38 and secondary chamber 35, with fantastic results in flame intensity and length. Exemplary pressurization apparatus can be provided by, for example, applying an air source to opening 84 and/or providing one or more heat conductive chimney-like vapor chamber assembly 31 in addition to chamber 38 and/or secondary chamber 35. In one such example shown in FIG. 11, a narrow straw-like vapor chamber assembly 31 is inserted down through the center of the heat transfer element 30 towards the bottom inlet end 32, the vapor chamber assembly 31 having a significantly restricted (yet open) opposite outlet end 152, which may be adjacent an outlet end 150 of secondary chamber 35 and/or outlet opening 34 of chamber 38 of heat transfer element 30. In the embodiment of FIG. 11, when the solid state fuel 131 melts, the resulting liquid state fuel 132 enters the chamber 38 of heat transfer element 30, and the secondary chamber 35. Air and/or vapor state fuel 134 trapped in secondary chamber 35 becomes heated and exerts pressure on the surface of liquid state fuel 134 in secondary chamber 35, forcing liquid state fuel in the secondary chamber 35 into the vapor chamber assembly 31. The heat conducted to the fuel 132 by the vapor chamber assembly 31, as well as by the wick flame 26 and the surrounding secondary chamber 35, wick 40, and heat transfer element 30, causes at least some of the liquid state fuel 132 in vapor chamber assembly 31 to vaporize. The resulting pressurized vapor state fuel 134, and possibly some liquid state fuel 132 then exits the vapor chamber assembly 31 through outlet opening 152. Optionally, the vapor chamber assembly 31 outlet 152 can be positioned downstream of the diffuser disk 52 to allow some fuel 130 to be combusted and/or vaporized at, or downstream, of the diffuser assembly 50. Additional or alternative pressurization may be accomplished, for example, by pumping of air, and/or by forcing liquid state fuel 132 through increasingly reduced channels and conduit in the reservoir 80 and/or heat transfer element 30, among other methods and apparent from this disclosure. By way of additional example, meltable fuel 130 can be converted into a liquid state fuel 132 and pressurized either manually (by a pumping device), by an externally powered device or a trapped air or other pressure-inducing medium that will naturally expand when heated (air, gas, solid substance), or anything that has the potential to impart stored energy on the liquid fuel 132 in an open and/or closed version of reservoir 80, including but not limited to a spring-loaded and/or air-loaded bellows baffle, or other known pressurizing devices. By further example, in a closed reservoir 80 embodiment, the heat transfer element 30 may heat any air trapped at the top of the closed reservoir 80, causing pressure that in turn bears down on the surface of fuel 130 in reservoir 80, forcing heated melted liquid state fuel 132 into the inlet opening 32 and/or apertures 33, adding to the pressure in the chamber 38, secondary chamber 35 and ultimately the vapor chamber assembly 31.

While the examples herein describe a self-contained apparatus 10 wherein the fuel 130 is stored as solid state fuel 131, heated to a liquid state fuel 132, and converted to vapor state fuel 134 within the self-contained unit, it is contemplated that those steps can be performed in combination with remote units, with the liquid state fuel 132 and/or vapor state fuel 134 being transported, such as through a pipe or other suitable gas vapor conduit, to an ignition source for combustion. Moreover, it is contemplated herein that the fuel state conversion may be provided at multiple locations within or remote from the ignition source. In this manner, a single gas generation unit may be provided with more fuel that it can self-generate, thereby providing an increased combustion zone 120 result, with attendant higher thermal output and/or light output. Moreover, the inventive concept herein is extendable to provide multiple gas generation assemblies 20 and apparatus 10, whether in series, parallel, or otherwise to provide a desired gas generation result.

Moreover, it is contemplated that the adjustable mechanism for the nozzle assembly 60 and diffuser assembly 50 position and height can incorporate any number of adjustment means. By way of non-limiting example, friction devices can be provided to maintain a desired height, such as compressible material and spring metal mounted on the nozzle assembly 60 and/or on the housing 70 and/or reservoir 80 body. The apparatus 10 incorporates passive and automatic apparatus, assemblies, materials, each of which are selectable depending on variables such as shape, size, flexibility, plasticity, hardness, heat conductivity, and other characteristics of the material and the assembly and functions desired to be associated therewith.

The present apparatus and methods provide controlled generation and combustion of any low melting point dimensionally stable combustible material. This is preferably accomplished by first converting the solid or semi solid material into a liquid state, then into vapor, and finally mixing with an air source or other oxidizer before combustion. The liquid state conversion can be accomplished by any number of energy transfer activities, whether by heat, light, microwave, energy pulse, electricity, or other energy source operable as a heat source, whether on-site or remote. Once a solid meltable fuel 131 has reached a liquid state 131 and/or vapor state 134 it can be delivered to a consumption or storage site by capillary means or any suitable means including pumps, gravity, venturi, compressed gases such as air etc. Desired performance requirements such as combustion flame 120 versus fumigation will permit selection and design of the nozzle assembly 60.

Other features novel to the apparatus and methods described herein are provided by the new use of meltable fuels 130 as a storable, stable, non-toxic, and non-volatile fuel source. For example, a wax fueled heater, furnace, and/or fireplace that is either self sustaining in a wick flame 26 embodiment or that is electrically enabled by an electrical heat source 22 using meltable solid fuels 130 will be safe and able to remain dormant for an extended period of time without compromising fuel integrity or power. Lastly, the unit can include elements not shown, including but not limited to heater boxes to convect heat from a combustion flame 122 to another site, and/or a mantle installed (such as in or near the combustion zone 120) to permit operation of the apparatus 10 as a lantern. Additionally, features such as carrying handles, legs and/or base plates for stability, wind screens or thermal screens for absorbing or reflecting heat, and other features are contemplated.

The above description is intended as non-limiting, and the inventor has contemplated that any method or apparatus of using solid wax or other meltable fuels as a fuel source that can be liquefied and/or converted into vapor state is within the scope of the invention. While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

The invention claimed is:

1. A method of generating a gas or vapor state of a wax, the method comprising the steps of providing a gas generator assembly, introducing a meltable fuel consisting essentially of wax into the gas generator assembly, converting the wax to a wax gas or vapor, releasing the wax gas or vapor from the gas generator assembly, and combusting the released wax gas or vapor, wherein the method is not part of a refinery process; and wherein the step of converting the wax to a wax gas or vapor comprises heating the wax to a temperature above the liquid-gas transition temperature of the wax without cracking the wax.

2. The method of claim 1, further comprising a step of providing the released wax gas or vapor as a fuel for an apparatus that is not a candle or a refinery apparatus.

3. The method of claim 1, wherein the step of introducing a meltable fuel consisting essentially of wax comprises introducing a wax selected from the group consisting of paraffin wax, flora wax, insect wax, bees wax, soy wax, vegetable wax, animal wax, fossil fuel wax, palm wax, and plant wax.

4. The method of claim 1, wherein the step of converting the wax to a wax gas or vapor produces a continuous stream of wax gas or vapor.

5. The method of claim 1, wherein the step of introducing a meltable fuel consisting essentially of wax into the generator assembly is performed subsequent to any process of refining the meltable fuel.

6. The method of claim 5, wherein the step of providing a heat source in thermal connection with the wax comprises providing a heat transfer element in thermal connection with the heat source, the heat transfer element comprising a material having a thermal conductivity of greater than 10 W/m K.

7. The method of claim 1, wherein the step of providing a gas generator assembly comprises providing a heat source in thermal connection with the wax.

8. The method of claim 7, wherein the step of providing a heat source comprises providing a heat source selected from the group consisting of fire, flame, thermal heating elements, microwave heating elements, radiation, electricity, and electrical heating elements, solar, and laser.

9. The method of claim 8, wherein the heat source is a flame fueled by the wax.

10. The method of claim 9, further comprising the step of limiting the consumption of the wax by the flame by controlling the amount of air available to the flame.

11. The method of claim 7, wherein the step of providing a gas generation apparatus further comprises providing a fuel reservoir configured and disposed for receiving the meltable fuel consisting essentially of wax, and providing the heat source in thermal connection with the fuel reservoir.

12. The method of claim 1, further comprising the step of combining the wax gas or vapor with a second gas to form a combustible mixture.

13. The method of claim 12, wherein the step of combining the wax gas or vapor with a second gas to form a combustible mixture comprises introducing the wax gas or vapor and the second gas into a nozzle assembly.

14. The method of claim 12, further comprising the step of utilizing the combustible mixture as a fuel source for an apparatus selected from the group consisting of stoves, fumigation devices, lanterns, lamps, heaters, combustion engines, Stirling engines, boilers, generators, furnaces and fireplaces.

15. The method of claim 1, further comprising the step of providing released wax gas or vapor as a fuel source for at least one apparatus that is not a candle.

16. A method of generating a gas or vapor state of wax, the method comprising the steps of providing a device comprising a gas generator assembly, introducing a meltable fuel consisting essentially of wax into the gas generator assembly, converting at least a portion of the meltable fuel to a gas or vapor releasing the gas or vapor from the gas generator assembly, and providing released wax gas or vapor as a fuel source for at least one apparatus that is not a candle; and wherein the step of converting the wax to a wax gas or vapor comprises heating the wax to a temperature above the liquid-gas transition temperature of the wax without cracking the wax.

17. The method of claim 16, wherein the step of providing a device comprising a gas generator assembly comprises providing a gas generator assembly that comprises a heat source in thermal connection with a heat transfer element, and wherein the heat source is selected from at least one of fire, flame, thermal heating elements, microwave heating elements, radiation, electricity, and electrical heating elements, solar, and laser and wherein the heat transfer element is in thermal connection with the wax.

18. The method of claim 16, further comprising the step of combusting the gas or vapor.

19. The method of claim 18, wherein the apparatus is selected from the group consisting of stoves, fumigation devices, lanterns, lamps, heaters, combustion engines, Stirling engines, generators, furnaces, boilers, and fireplaces.

* * * * *

UNITED STATES PATENT AND TRADEMARK OFFICE
CERTIFICATE OF CORRECTION

| | | |
|---|---|---|
| PATENT NO. | : 8,268,027 B2 | Page 1 of 1 |
| APPLICATION NO. | : 12/709967 | |
| DATED | : September 18, 2012 | |
| INVENTOR(S) | : Raymond Gatt | |

It is certified that error appears in the above-identified patent and that said Letters Patent is hereby corrected as shown below:

a.    Replaced Claim 1 with the following:

1. A method of generating a gas or vapor state of a wax, the method comprising the steps of providing a gas generator assembly; introducing a meltable fuel consisting essentially of wax into the gas generator assembly; converting the wax to a wax gas or vapor, releasing the wax gas or vapor from the gas generator assembly; and utilizing the released wax gas or vapor as a fuel source by combusting the released wax gas or vapor in an apparatus selected from the group consisting of stoves, fumigation devices, lanterns, lamps, heaters, combustion engines, Stirling engines, boilers, generators, furnaces and fireplaces; and wherein the method is not part of a refinery.

b.    Replaced Claim 16 with the following:

16. A method of generating a gas or vapor state of a wax, the method comprising the steps of providing a device comprising a gas generator assembly that is not a candle; introducing a meltable fuel consisting essentially of wax into the gas generator assembly; converting at least a portion of the meltable fuel to a gas or vapor; releasing the gas or vapor from the gas generator assembly, and providing released wax gas or vapor as a fuel source for at least one apparatus selected from the group consisting of stoves, fumigation devices, lanterns, lamps, heaters, combustion engines, Stirling engines, boilers, generators, furnaces and fireplaces; and wherein the method is not part of a refinery.

Signed and Sealed this
Twenty-seventh Day of November, 2012

David J. Kappos
*Director of the United States Patent and Trademark Office*

UNITED STATES PATENT AND TRADEMARK OFFICE
CERTIFICATE OF CORRECTION

PATENT NO. : 8,268,027 B2  Page 1 of 1
APPLICATION NO. : 12/709967
DATED : September 18, 2012
INVENTOR(S) : Raymond Gatt It is certified that error appears in the above-identified patent and that said Letters Patent is hereby corrected as shown below:

Column 17, lines 6-16, Claim 1 should be replaced with the following:

--1. A method of generating a gas or vapor state of a wax, the method comprising the steps of providing a gas generator assembly; introducing a meltable fuel consisting essentially of wax into the gas generator assembly; converting the wax to a wax gas or vapor, releasing the wax gas or vapor from the gas generator assembly; and utilizing the released wax gas or vapor as a fuel source by combusting the released wax gas or vapor in an apparatus selected from the group consisting of stoves, fumigation devices, lanterns, lamps, heaters, combustion engines, Stirling engines, boilers, generators, furnaces and fireplaces; and wherein the method is not part of a refinery.--

Column 18, lines 21-32, Claim 16 should be replaced with the following:

--16. A method of generating a gas or vapor state of a wax, the method comprising the steps of providing a device comprising a gas generator assembly that is not a candle; introducing a meltable fuel consisting essentially of wax into the gas generator assembly; converting at least a portion of the meltable fuel to a gas or vapor; releasing the gas or vapor from the gas generator assembly, and providing released wax gas or vapor as a fuel source for at least one apparatus selected from the group consisting of stoves, fumigation devices, lanterns, lamps, heaters, combustion engines, Stirling engines, boilers, generators, furnaces and fireplaces; and wherein the method is not part of a refinery.--

This certificate supersedes the Certificate of Correction issued November 27, 2012.

Signed and Sealed this
First Day of January, 2013

David J. Kappos
*Director of the United States Patent and Trademark Office*